US011906912B2

(12) United States Patent
Watanabe et al.

(10) Patent No.: US 11,906,912 B2
(45) Date of Patent: Feb. 20, 2024

(54) TONER CONVEYANCE DEVICE THAT CAN EXECUTE TONER LOOSENING MODE, AND DEVELOPING DEVICE AND IMAGE FORMING APPARATUS INCLUDING THE SAME

(71) Applicant: KYOCERA Document Solutions Inc., Osaka (JP)

(72) Inventors: Akihiro Watanabe, Osaka (JP); Eiji Gyotoku, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/968,435

(22) Filed: Oct. 18, 2022

(65) Prior Publication Data

US 2023/0131628 A1 Apr. 27, 2023

(30) Foreign Application Priority Data

Oct. 25, 2021 (JP) ................................. 2021-174021

(51) Int. Cl.
*G03G 15/08* (2006.01)
*G03G 15/00* (2006.01)

(52) U.S. Cl.
CPC ..... *G03G 15/0891* (2013.01); *G03G 15/0865* (2013.01); *G03G 15/0889* (2013.01);
(Continued)

(58) Field of Classification Search
CPC ............... G03G 15/0865; G03G 15/50; G03G 2215/0636; G03G 15/0879;
(Continued)

(56) References Cited

U.S. PATENT DOCUMENTS

2010/0040391 A1* 2/2010 Uno ..................... G03G 21/105 399/53
2010/0272475 A1* 10/2010 Yamamoto ......... G03G 15/0877 399/258

(Continued)

FOREIGN PATENT DOCUMENTS

JP 2017227853 A * 12/2017
WO WO 2013/128844 A1 9/2013

*Primary Examiner* — Arlene Heredia
*Assistant Examiner* — Laura Roth
(74) *Attorney, Agent, or Firm* — Stein IP, LLC

(57) ABSTRACT

A toner conveyance device includes a vertical conveyance portion, a horizontal conveyance portion, a conveyance member, and a loosening member. The vertical conveyance portion conveys a toner or developer conveyed therein through an entry port connected to a main-body-side conveyance path by causing the toner or developer to fall vertically. The horizontal conveyance portion is connected to a lower end of the vertical conveyance portion and conveys the toner or developer in a horizontal direction by using the conveyance member. the loosening member is arranged at a first position below a connection portion between the main-body-side conveyance path and the entry port and at a second position protruding upward beyond the connection portion. A toner loosening mode is executable in which the toner or developer is fed into the vertical conveyance portion so as to cause the loosening member to reciprocate at the second position.

10 Claims, 9 Drawing Sheets

(52) U.S. Cl.
CPC ......... *G03G 15/50* (2013.01); *G03G 15/0879* (2013.01); *G03G 2215/0636* (2013.01)

(58) Field of Classification Search
CPC ........... G03G 15/0889; G03G 15/0891; G03G 2215/0852; G03G 15/0893; G03G 2215/0838; G03G 2215/0833; G03G 21/105; G03G 2221/1624
See application file for complete search history.

(56) References Cited

U.S. PATENT DOCUMENTS

| | | | | |
|---|---|---|---|---|
| 2013/0017001 | A1* | 1/2013 | Yamanaka ......... | G03G 15/0879 399/258 |
| 2014/0076691 | A1* | 3/2014 | Yamada ................. | B65G 33/14 198/548 |
| 2022/0413416 | A1* | 12/2022 | Kitagawa ........... | G03G 15/0891 |
| 2023/0129577 | A1* | 4/2023 | Watanabe .......... | G03G 15/0889 399/119 |

* cited by examiner

TONER CONVEYANCE DEVICE THAT CAN EXECUTE TONER LOOSENING MODE, AND DEVELOPING DEVICE AND IMAGE FORMING APPARATUS INCLUDING THE SAME

INCORPORATION BY REFERENCE

This application is based upon and claims the benefit of priority from the corresponding Japanese Patent Application No. 2021-174021 (filed on Oct. 25, 2021), the entire contents of which are incorporated herein by reference.

BACKGROUND

The present disclosure relates to a toner conveyance device that conveys a toner and relates particularly to a toner conveyance device including a toner conveyance section composed of a vertical conveyance portion that causes a toner to fall in a vertical direction and a horizontal conveyance portion that is connected to a lower end of the vertical conveyance portion, and a developing device and an image forming apparatus including the same.

An image forming apparatus employing an electrophotographic method, such as a printer or a copy machine, includes a photosensitive drum that carries an electrostatic latent image, a developing device that supplies a toner to the photosensitive drum so as to develop the electrostatic latent image into a toner image, and a toner container for replenishing the developing device with the toner. In a color image forming apparatus, there may be adopted a layout in which an intermediate transfer unit is interposed between the toner container and the developing device. In such a case, since there is a distance between the toner container and the developing device, a toner conveyance section is provided that conveys a toner from a toner discharge port of the toner container to a toner reception port of the developing device.

In this case, in a configuration allowing the toner container to be arranged immediately above the developing device, it is sufficient that the toner conveyance section includes only a vertical conveyance portion that causes a toner to fall vertically. In a case, however, where the toner container can hardly be arranged immediately above the developing device under layout constraints, it is required that the toner conveyance section include, in addition to the vertical conveyance portion, a horizontal conveyance portion that conveys a toner in a horizontal direction. A conveyance screw for conveying a toner is arranged in the horizontal conveyance portion.

In the toner conveyance section in which the horizontal conveyance portion is connected to the vertical conveyance portion, a toner might coagulate in a vicinity of a lower end of the vertical conveyance portion (a connection portion where the vertical conveyance portion is connected to the horizontal conveyance portion), causing an impediment to smooth toner replenishment. This is attributable to a phenomenon in which when the conveyance screw is driven to rotate, a toner in the vicinity of the lower end of the vertical conveyance portion is pushed back upward, so that coagulation and agglomeration (blocking) of the toner occurs to block a conveyance path.

SUMMARY

A toner conveyance device according to an aspect of the present disclosure includes a vertical conveyance portion, a horizontal conveyance portion, a conveyance member, and a loosening member and is demountably mounted in an image forming apparatus. The vertical conveyance portion has an entry port and conveys a toner or a developer containing the toner conveyed therein through the entry port by causing the toner or the developer to fall vertically, the entry port being formed at an upper end of the vertical conveyance portion and connected to a main-body-side conveyance path in the image forming apparatus. The horizontal conveyance portion is connected to a lower end of the vertical conveyance portion and conveys the toner or the developer in a horizontal direction. The conveyance member includes a rotary shaft that is arranged in the horizontal conveyance portion along a conveyance direction of the toner or the developer and a conveyance protrusion that is provided to protrude on an outer circumferential surface of the rotary shaft. The conveyance member causes the rotary shaft to rotate so that the toner or the developer in the horizontal conveyance portion is conveyed in a direction along the rotary shaft by the conveyance protrusion. The loosening member is arranged in the vertical conveyance portion so as to be movable in a vertical direction. The loosening member is arranged so as to be movable between a first position below a connection portion between the main-body-side conveyance path and the entry port and a second position protruding upward beyond the connection portion and is reciprocatable in the vertical direction at each of the first position and the second position. The loosening member is arranged at the first position under its own weight when a volume of the toner or the developer in the horizontal conveyance portion is less than a prescribed value and is arranged at the second position by being pushed up by the toner or the developer when the volume of the toner or the developer in the horizontal conveyance portion is not less than the prescribed value. The toner or the developer is tied into the vertical conveyance portion so as to enable execution of a toner loosening mode in which the loosening member is caused to reciprocate at the second position.

DETAILED DESCRIPTION

Figure 1:
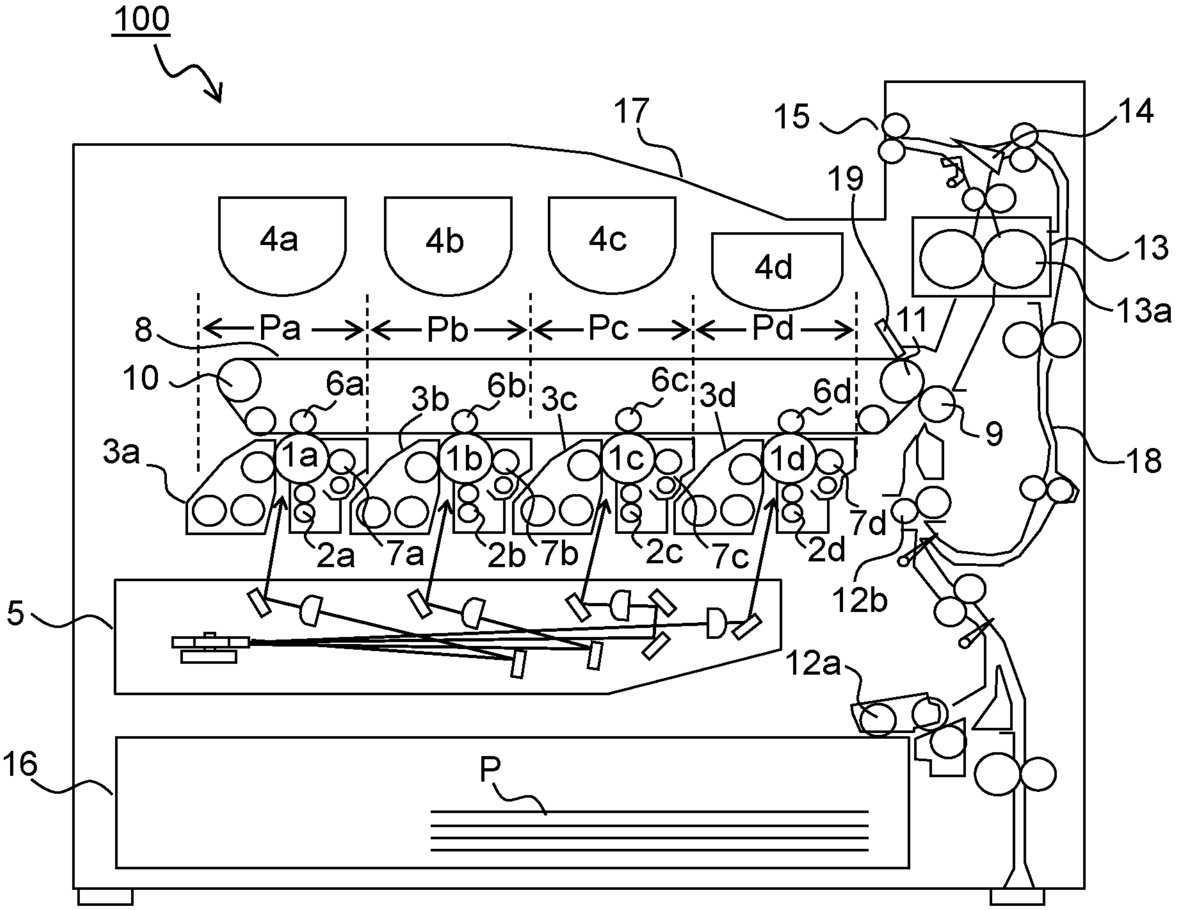
FIG. 1 is a schematic sectional view of an image forming apparatus mounting therein a developing device to which a toner replenishment section of the present disclosure is connected.

With reference to the appended drawings, the following describes an embodiment of the present disclosure. FIG. 1 is a sectional view showing an internal structure of an image forming apparatus 100 including developing devices 3*a* to 3*d* to each of which a toner replenishment section 32 (see FIG. 2) of the present disclosure is connected. In a main body of the image forming apparatus 100 (herein, a color printer), four image forming portions Pa, Pb, Pc, and Pd are disposed in order from an upstream side in a conveyance direction (a left side in FIG. 1). The image forming portions Pa to Pd are provided correspondingly to images of four different colors (yellow, cyan, magenta, and black) and sequentially form images of yellow, cyan, magenta, and black, respectively, by individually performing steps of charging, exposure, development, and transfer.

In the image forming portions Pa to Pd, photosensitive drums (image carrying members) 1*a*, 1*b*, 1*c*, and 1*d* are disposed, respectively, to carry visible images (toner images) of the respective colors. Moreover, an intermediate transfer belt (an intermediate transfer member) 8 that is driven by a belt drive motor (not shown) to rotate in a counterclockwise direction in FIG. 1 is provided adjacently to the image forming portions Pa to Pd.

Figure 10:
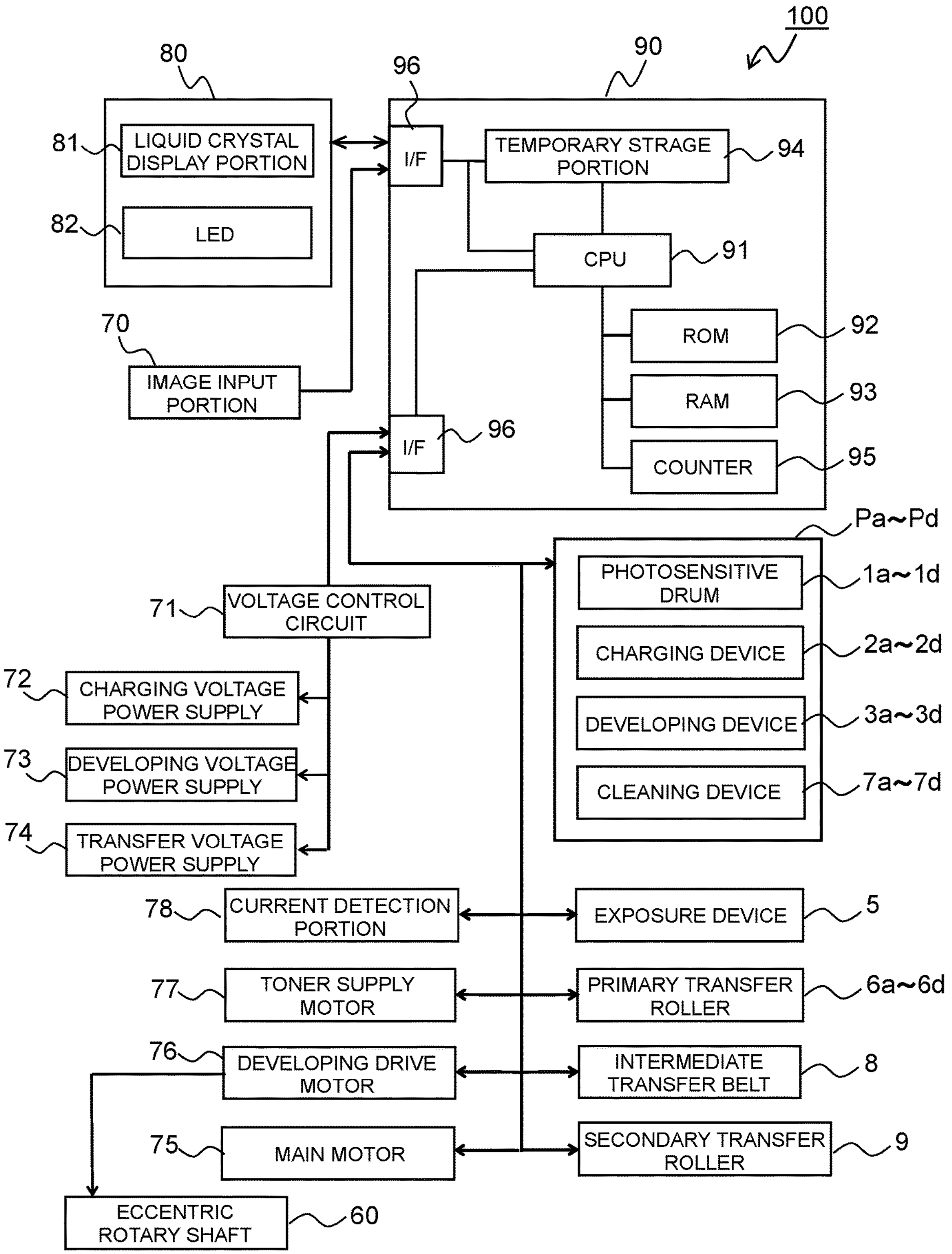
FIG. 10 is a block diagram showing an example of control paths of the image forming apparatus.

Upon image data being inputted from a host apparatus such as a personal computer, first, the photosensitive drums 1*a* to 1*d* start to be driven to rotate by a main motor 75 (see FIG. 10). Further, surfaces of the photosensitive drums 1*a* to 1*d* are uniformly charged by charging devices 2*a* to 2*d*, respectively. Then, by an exposure device 5, light is applied thereto so as to correspond to the image data so that electrostatic latent images corresponding to the image data are formed on the photosensitive drums 1*a* to 1*d*, respectively. The developing devices 3*a* to 3*d* are filled with prescribed amounts of two-component developers including toners of yellow, cyan, magenta, and black, respectively. In a case where a percentage of the toners in the two-component developers filled in the developing devices 3*a* to 3*d* falls below a preset value due to after-mentioned toner image formation, the developing devices 3*a* to 3*d* are replenished with fresh supplies of toners from toner containers 4*a* to 4*d*, respectively. The toners in the developers are supplied onto the photosensitive drums 1*a* to 1*d* by the developing devices 3*a* to 3*d*, respectively, and electrostatically adhere thereto. Consequently, there are formed toner images corresponding to the electrostatic latent images formed by exposure from the exposure device 5.

Further, by primary transfer rollers 6*a* to 6*d*, an electric field is applied at a prescribed transfer voltage between themselves and the photosensitive drums 1*a* to 1*d*, respectively, and thus the toner images of yellow, cyan, magenta, and black on the photosensitive drums 1*a* to 1*d* are primarily transferred on the intermediate transfer belt 8. A residual toner or the like remaining on the surfaces of the photosensitive drums 1*a* to 1*d* after primary transfer is removed by cleaning devices 7*a* to 7*d*, respectively.

A transfer sheet P on which toner images are to be secondarily transferred is housed in a sheet cassette 16 arranged in a lower part of the main body of the image forming apparatus 100. The transfer sheet P is conveyed to a nip between a secondary transfer roller 9 and a driving roller 11 of the intermediate transfer belt 8 via a paper feed roller 12*a* and a registration roller pair 12*b*. A blade-shaped belt cleaner 19 for removing a residual toner or the like remaining on a surface of the intermediate transfer belt 8 is arranged on a downstream side of the secondary transfer roller 9.

The transfer sheet P conveyed to a fixing portion 13 is heated and pressed by a fixing roller pair 13*a*, and thus the toner images are fixed on a surface of the transfer sheet P to form a prescribed full-color image thereon. A conveyance direction of the transfer sheet P on which the full-color image has been formed is controlled by a branch portion 14 branching off in a plurality of directions, and the transfer sheet P is directly (or after being conveyed to a double-sided conveyance path 18 and subjected to double-sided image formation therein) discharged to a discharge tray 17 by a discharge roller pair 15.

Figure 2:
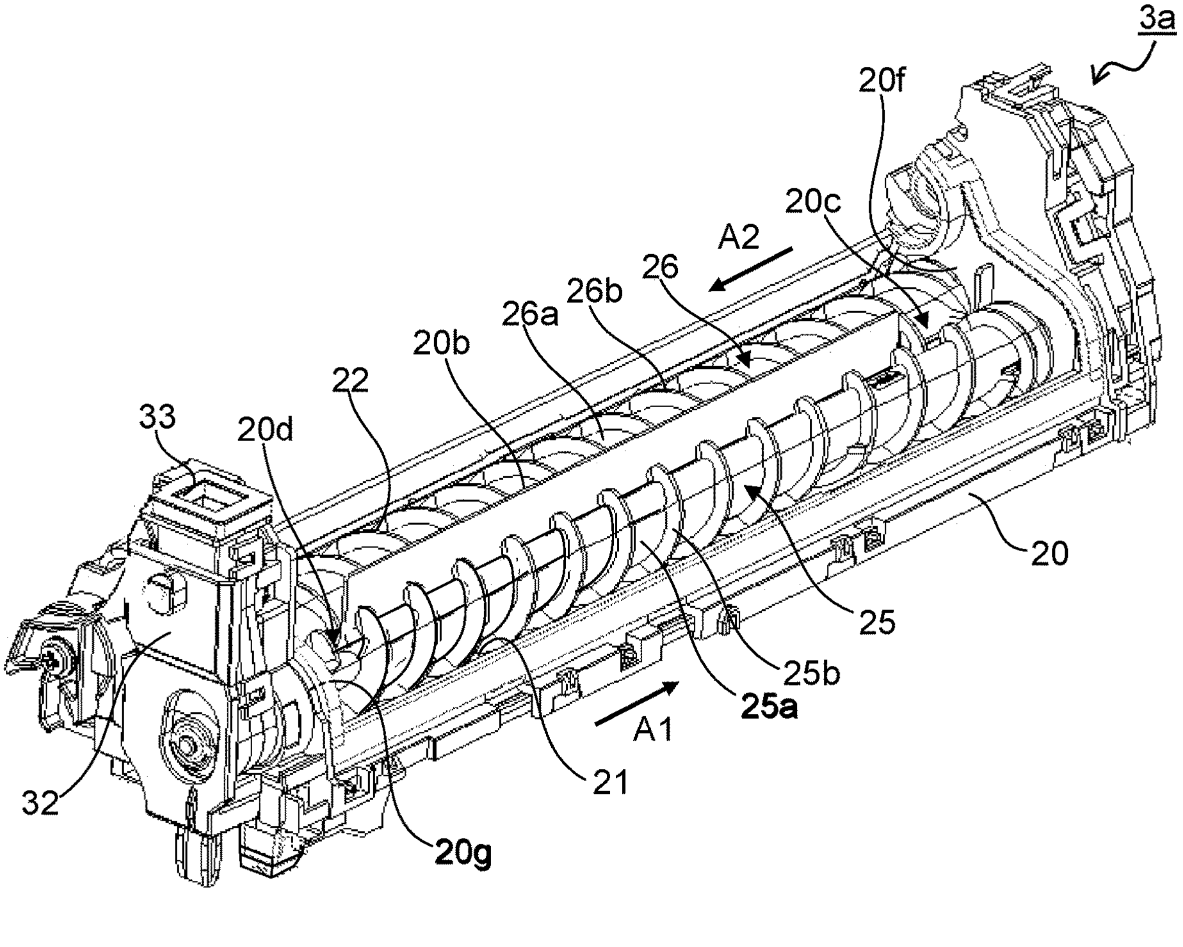
FIG. 2 is a perspective view of the developing device that is mounted in the image forming apparatus.
Figure 3:
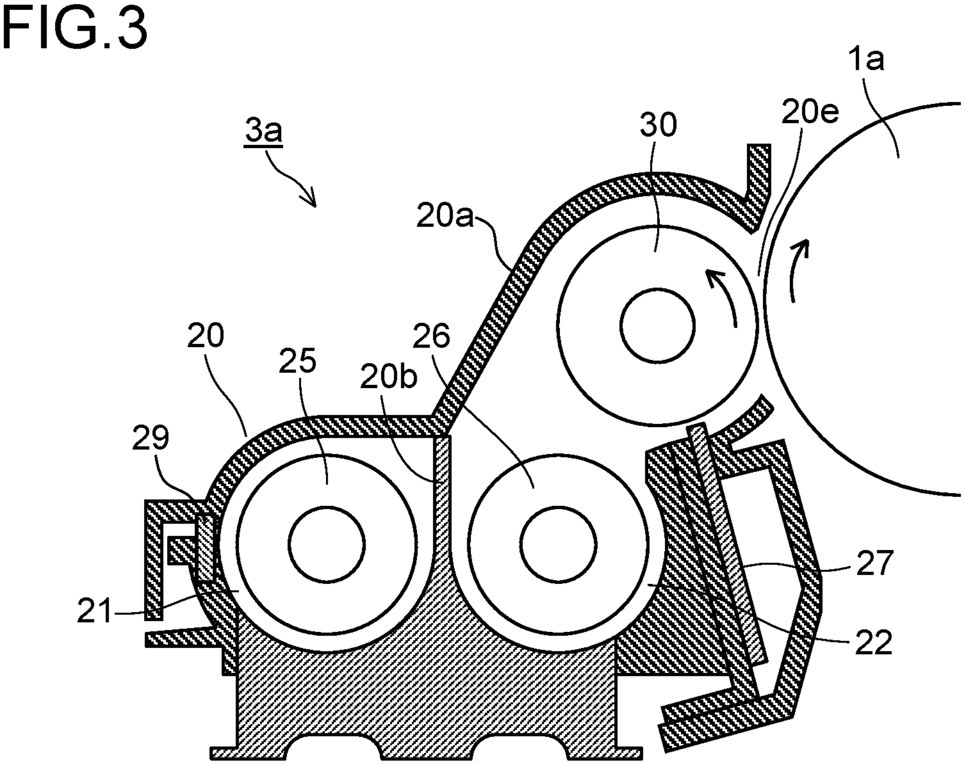
FIG. 3 is a side sectional view of the developing device.

FIG. 2 is a perspective view of the developing device 3*a* that is mounted in the image forming apparatus 100. FIG. 3 is a side sectional view of the developing device 3*a*. FIG. 2 shows a state where a cover member 20*a* of a developing container 20 and a developing roller 30 have been removed. Furthermore, while the following illustratively describes the developing device 3*a* arranged in the image forming portion Pa in FIG. 1, the developing devices 3*b* to 3*d* arranged in the image forming portions Pb to Pd, respectively, are basically similar in configuration to the developing device 3*a*, and thus descriptions thereof are omitted. The developing devices 3*a* to 3*d* are demountably mounted in the image forming apparatus 100.

As shown in FIG. 2 and FIG. 3, the developing device 3*a* includes the developing container 20 for containing therein a two-component developer (hereinafter, also referred to simply as a developer) including a magnetic carrier and a toner. The developing container 20 includes the cover member 20*a*, a partition wall 20*b*, a first communication portion 20*c*, a second communication portion 20*d*, a stirring conveyance chamber 21, a supply conveyance chamber 22, and the toner replenishment section 32.

The cover member 20*a* is detachably attached to a main body of the developing container 20 and constitutes an upper part of the developing container 20. The partition wall 20*b* divides an interior of the developing container 20 into the stirring conveyance chamber 21 and the supply conveyance chamber 22 that are arranged in parallel. At both ends of the partition wall 20*b* in a longitudinal direction thereof, the first communication portion 20*c* and the second communication portion 20*d* establish communication between the stirring conveyance chamber 21 and the supply conveyance chamber 22.

In the stirring conveyance chamber 21 and the supply conveyance chamber 22, a stirring conveyance screw 25 and a supply conveyance screw 26 for making a mixture of a toner supplied from the toner container 4*a* (see FIG. 1) and a magnetic carrier, stirring the mixture, and charging the toner are rotatably disposed, respectively. This embodiment uses a two-component developer composed of a positively chargeable toner and a ferrite/resin-coated carrier.

The stirring conveyance screw 25 includes a rotary shaft 25*a* and a first conveyance vane 25*b* that is helically formed at a set pitch on the rotary shaft 25*a* in an axial direction thereof. The rotary shaft 25*a* and the first conveyance vane 25*b* are integrally formed using a synthetic resin. The first conveyance vane 25*b* extends to both end sides of the stirring conveyance chamber 21 in a longitudinal direction thereof so as to be opposed to the first communication portion 20*c* and the second communication portion 20*d*. The rotary shaft 25*a* is rotatably supported to a first side wall 20*f* and a second side wall 20*g* of the developing container 20. The stirring conveyance screw 25 conveys, while stirring, the developer in the stirring conveyance chamber 21 in a set direction (an arrow A1 direction).

The supply conveyance screw 26 includes a rotary shaft 26*a* and a second conveyance vane 26*b* that is helically formed at a set pitch on the rotary shaft 26*a* in an axial direction thereof. The rotary shaft 26*a* and the second conveyance vane 26*b* are integrally formed using a synthetic resin. The second conveyance vane 26*h* has a length not less than a length of the developing roller 30 in an axial direction thereof and extends to positions opposed to the first communication portion 20*c* and the second communication portion 20*d*, respectively. The rotary shaft 26*a* is arranged parallel to the rotary shaft 25*a* and is rotatably supported to the first side wall 20*f* and the second side wall 20*g* of the developing container 20. The supply conveyance screw 26 conveys, while stirring, the developer in the supply conveyance chamber 22 in a direction (an arrow A2 direction) opposite to the conveyance direction of the stirring conveyance screw 25.

Further, the developer is conveyed while being stirred by the stirring conveyance screw 25 and the supply conveyance screw 26 in an axial direction thereof (a direction vertical to a plane on which FIG. 3 is drawn) and circulates between the stirring conveyance chamber 21 and the supply conveyance chamber 22 via the first communication portion 20*c* and the second communication portion 20*d* formed at the both ends of the partition wall 20*b*. That is, in the developing container 20, a circulation path of the developer is formed by the stirring conveyance chamber 21, the first communication portion 20*c*, the supply conveyance chamber 22, and the second communication portion 20*d*.

The developing container 20 extends to a diagonally upper right side in FIG. 3, and the developing roller 30 is arranged on a diagonally upper right side of the supply conveyance screw 26 in the developing container 20. Further, a part of an outer circumferential surface of the developing roller 30 is exposed through an opening 20*e* of the developing container 20 and is opposed at a prescribed distance (a developing gap) to the photosensitive drum 1*a*. The developing roller 30 rotates (performs trail rotation at a position opposed to the photosensitive drum 1*a*) in a counterclockwise direction in FIG. 3.

The developing roller 30 is composed of a cylindrical developing sleeve that rotates in the counterclockwise direction in FIG. 3 and a magnet (not shown) that has a plurality of magnetic poles and is secured in the developing sleeve. While the developing sleeve used herein is a developing sleeve having a knurled surface, it is also possible to use a developing sleeve having a surface with a multitude of concaves (dimples) formed therein, a developing sleeve having a blasted surface, a developing sleeve having a surface not only knurled and including concaves formed therein but also blasted, a developing sleeve having a plated surface intended to improve endurance, a developing sleeve having an anodized surface, or a developing sleeve having a surface treated, after being anodized, by a method in which a metallic salt such as Ni, Sn, or Mo is applied to a porous region of anodized aluminum, i.e., a so-called secondary electrolytic coloring method. By a developing voltage power supply 73 (see FIG. 10), a developing voltage composed of a direct current voltage Vdc and an alternating current voltage Vac is applied to the developing roller 30.

Furthermore, a restriction blade 27 is attached to the developing container 20 along a longitudinal direction of the developing roller 30 (the direction vertical to the plane on which FIG. 3 is drawn). A slight clearance (gap) is formed between a distal end of the restriction blade 27 and the developing roller 30. In this embodiment, a magnetic blade made of stainless steel (SUS4130) is used as the restriction blade 27.

On a side surface of the stirring conveyance chamber 21, a toner concentration sensor 29 is arranged to be opposed to the stirring conveyance screw 25. The toner concentration sensor 29 detects a concentration of the toner in the developer (a mixing ratio T/C of the toner to the carrier in the developer) in the developing container 20. As the toner concentration sensor 29, for example, a magnetic permeability sensor is used that detects a magnetic permeability of a two-component developer composed of a toner and a magnetic carrier in the developing container 20. Based on the toner concentration detected by the toner concentration sensor 29, the toner in the toner container 4*a* (see FIG. 1) is replenished into the developing container 20 via the toner replenishment section 32.

The toner replenishment section 32 is provided on an upstream side with respect to a developer conveyance direction (the arrow A1 direction) in the stirring conveyance chamber 21. The toner replenishment section 32 includes a toner replenishment port 33, a vertical conveyance portion 34*a*, and a horizontal conveyance portion 34*b* (these are all shown in FIG. 4 and FIG. 5). The toner replenishment port 33 is Open at an upper part of the toner replenishment section 32 and is connected to a main-body-side conveyance path 40 (see FIG. 4) extending downward from the toner container 4*a* (see FIG. 1).

Figure 4:
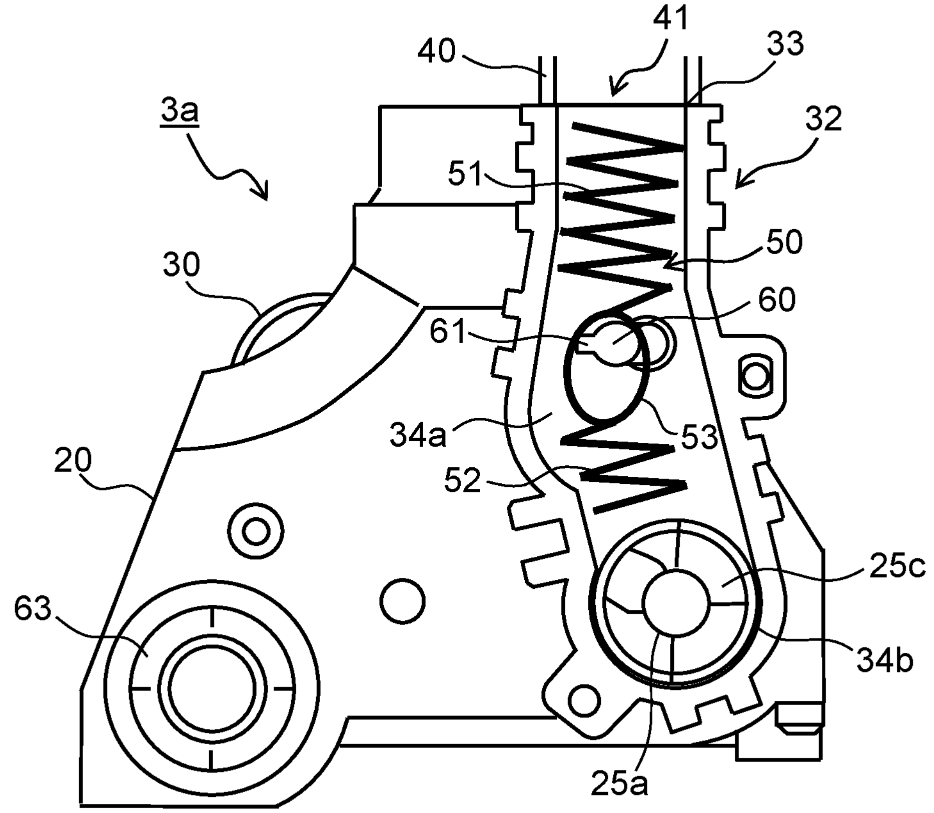
FIG. 4 is a side view of the developing device as viewed from near the toner replenishment section, illustrating a state where a loosening member is at a first position.
Figure 5:
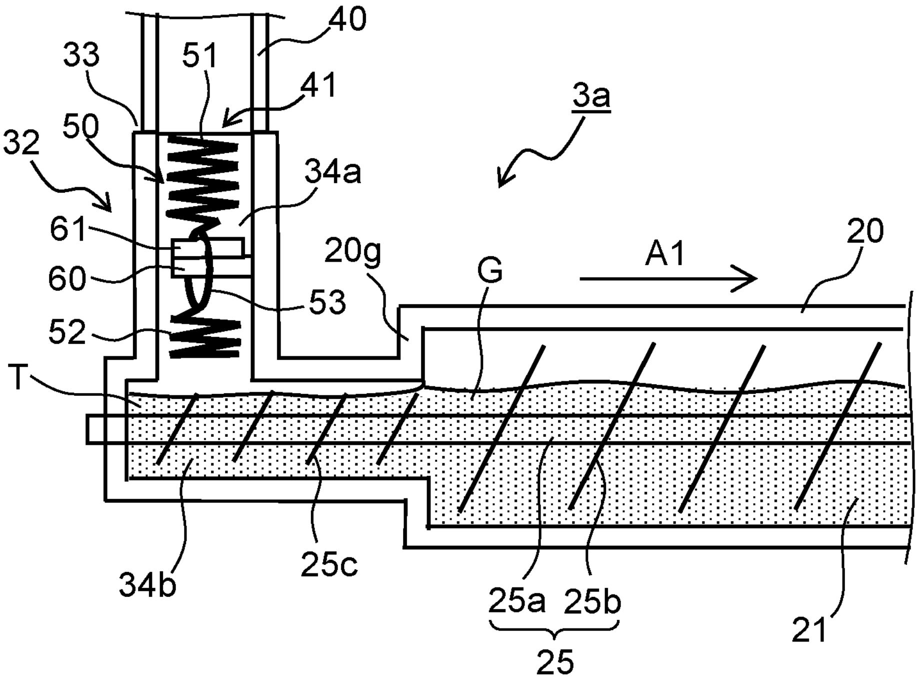
FIG. 5 is a longitudinal sectional view of the toner replenishment section and a stirring conveyance chamber of the developing device, illustrating the state where the loosening member is at the first position.
Figure 6:
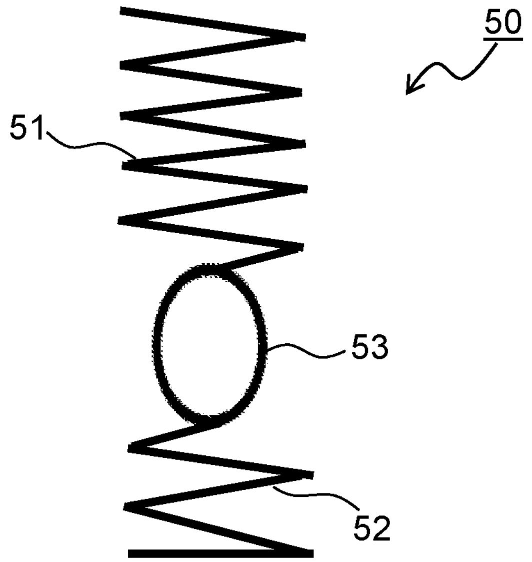
FIG. 6 is a side view of the loosening member as viewed from an opening direction of an annular portion thereof.

FIG. 4 is a side view of the developing device 3*a* as viewed from near the toner replenishment section 32. FIG. 5 is a longitudinal sectional view of the toner replenishment section 32 and the stirring conveyance chamber 21 of the developing device 3*a*. FIG. 6 is a side view of a loosening member 50 that is arranged in the vertical conveyance portion 34*a* of the toner replenishment section 32 as viewed from an opening direction of an annular portion 53 of the loosening member 50.

As shown in FIG. 4, a drive input gear 63 is additionally provided at an end of the developing container 20 near the toner replenishment section 32. The drive input gear 63 inputs a driving force of a developing drive motor 76 (see FIG. 10) to the stirring conveyance screw 25, the supply conveyance screw 26, and the developing roller 30 of the developing device 3*a*.

The vertical conveyance portion 34*a* conveys (causes to fall), in a vertical direction, the toner conveyed therein through the toner replenishment port 33. The horizontal conveyance portion 34*b* extends horizontally on a lower side of the vertical conveyance portion 34*a* and receives the toner from the vertical conveyance portion 34*a* to convey it in a horizontal direction. The horizontal conveyance portion 34*b* communicates with the stirring conveyance chamber 21 from an upstream side (a left side in FIG. 5) with respect to the developer conveyance direction (the arrow A1 direction) in the stirring conveyance chamber 21.

The rotary shaft 25*a* of the stirring conveyance screw 25 passes through the second side wall 20*g* of the developing container 20 and further extends into the horizontal conveyance portion 34*b* of the toner replenishment section 32. Integrally formed with a part of the rotary shaft 25*a* arranged in the horizontal conveyance portion 34*b* is a replenishment vane 25*c* that is helically formed at a set pitch on the rotary shaft 25*a* in the axial direction thereof. The replenishment vane 25*c* is formed of a vane helically wound in the same direction (in the same phase) as a winding direction of the first conveyance vane 25*b* so as to be smaller in pitch and diameter than the first conveyance vane 25*b*. That is, the stirring conveyance screw 25 functions also as a conveyance member that conveys the toner in the horizontal conveyance portion 34*h* toward the stirring conveyance chamber 21.

The toner conveyed from the toner container 4*a* into the toner replenishment port 33 via the main-body-side conveyance path 40 passes through the vertical conveyance portion 34*a* to fall into the horizontal conveyance portion 34*b*. The toner that has fallen into the horizontal conveyance portion 34*b* is conveyed in the horizontal direction (a rightward direction in FIG. 5) by the replenishment vane 25*c* of the stirring conveyance screw 25 and enters the stirring conveyance chamber 21 along the rotary shaft 25*a*. Further, the toner is stirred and mixed with the developer in the stirring conveyance chamber 21 (the developer that circulates from the supply conveyance chamber 22 by passing through the second communication portion 20*d*) and thus is charged to a prescribed charge amount.

The loosening member 50 is arranged in the vertical conveyance portion 34*a*. The loosening member 50 is formed by bending a metal wire (a spring material) and includes a first loosening portion 51 and a second loosening portion 52 that are each in the shape of a coil spring (a helical spring) and the annular portion 53. The first loosening portion 51 is arranged on an upper side in the vertical conveyance portion 34*a* and has an upper end opposed to the toner replenishment port 33, The second loosening portion 52 is arranged on a lower side in the vertical conveyance portion 34*a* and has a lower end opposed to the replenishment vane 25*c* in the horizontal conveyance portion 34*b*. The first loosening portion 51 and the second loosening portion 52 each have an outer diameter smaller than an inner diameter of the vertical conveyance portion 34*a*.

The annular portion 53 is in an oval shape elongated in the vertical direction and has an upper end to which the first loosening portion 51 is connected and a lower end to which the second loosening portion 52 is connected. The annular portion 53 is fitted over an eccentric rotary shaft 60 that is provided to protrude horizontally in the vertical conveyance portion 34*a*.

A protrusion 61 is formed on a part of an outer circumferential surface of the eccentric rotary shaft 60. The eccentric rotary shaft 60 is caused to rotate by a drive source (the developing drive motor 76) shared with the stirring conveyance screw 25, the supply conveyance screw 26, and the developing roller 30. The annular portion 53 has an inner diameter larger than an outer diameter of the eccentric rotary shaft 60 and engages with the eccentric rotary shaft 60, with a prescribed clearance (backlash) provided therebetween in the vertical direction.

Figure 7:
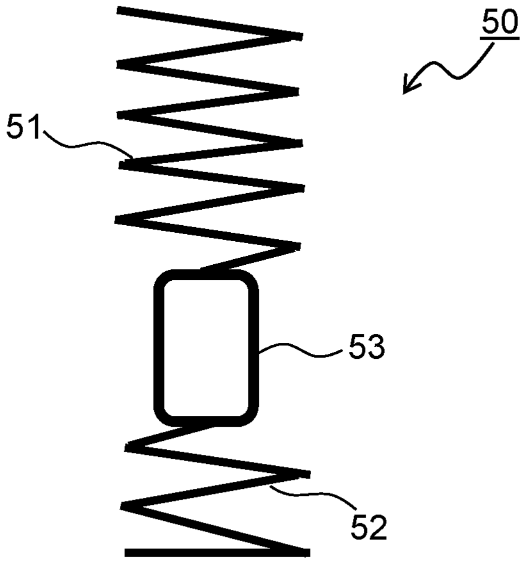
FIG. 7 is a side view showing another example of the loosening member different in shape of the annular portion.

FIG. 7 is a side view showing another example of the loosening member 50 different in shape of the annular portion 53. The annular portion 53 is only required to have a shape open in the horizontal direction and may have a rectangular shape as shown in FIG. 7 or a polygonal shape such as a hexagonal shape. It is, however, preferable that the annular portion 53 has an oval shape as shown in FIG. 6 or a rectangular shape whose inner circumferential surface has rounded corners as shown in FIG. 7 so that the loosening member 50 can reciprocate smoothly by rotation of the eccentric rotary shaft 60.

Next, a description is given of an ascending/descending motion of the loosening member 50. FIG. 4 and FIG. 5 show a state where the loosening member 50 is at a position (a first position) in proximity to the replenishment vane 25*c*. In a normal printing state, as shown in FIG. 4 and FIG. 5, the toner in the horizontal conveyance portion 34*h* makes no contact with the second loosening portion 52. The loosening member 50, therefore, is supported by the eccentric rotary shaft 60. Furthermore, the first loosening portion 51 is positioned below a connection portion 41 between the toner replenishment port 33 and the main-body-side conveyance path 40.

When the eccentric rotary shaft 60 rotates in this state, the protrusion 61 makes contact with or separates from an inner circumferential surface of the annular portion 53 at a set cycle. More specifically, there repeatedly occur a state where the protrusion 61 makes contact with the inner circumferential surface of the annular portion 53 so that the annular portion 53 is lifted and a state where the protrusion 61 separates therefrom so that the annular portion 53 descends under its own weight. As a result, within the vertical conveyance portion 34*a*, the loosening member 50 reciprocates in an up-down direction at the first position at which a clearance between the annular portion 53 and the eccentric rotary shaft 60 lies on a lower side of the eccentric rotary shaft 60. Consequently, an interior of the vertical conveyance portion 34*a* is always in a state where a scraping-off operation is executed as a result of reciprocation of the loosening member 50 therein, and thus toner agglomeration can be prevented from occurring in the vertical conveyance portion 34*a*.

Figure 8:
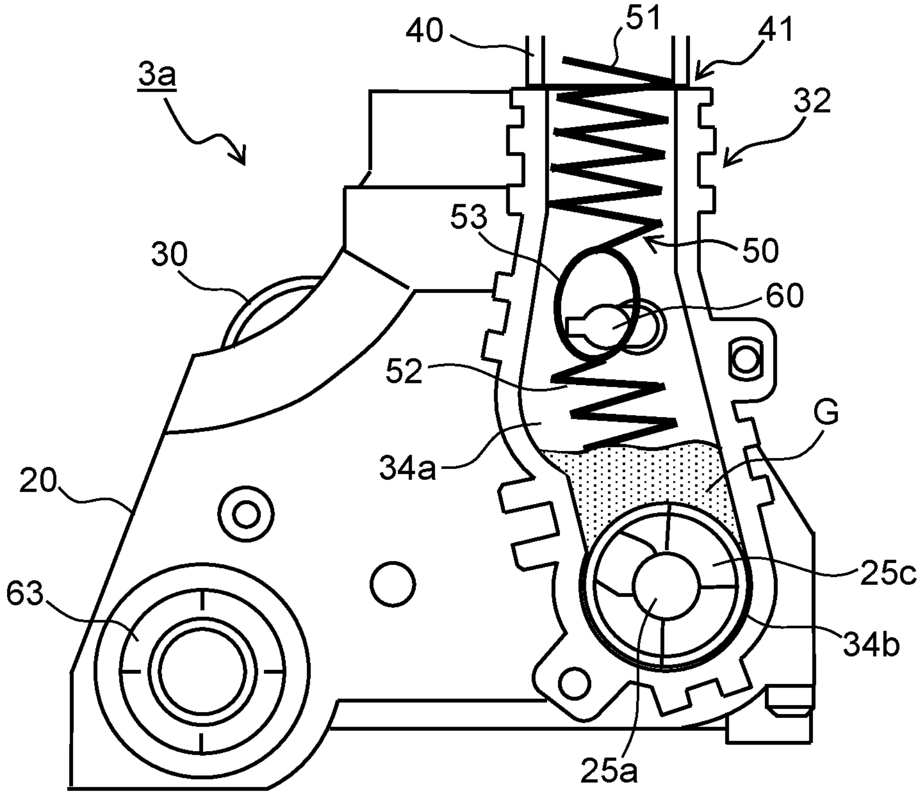
FIG. 8 is a side view of the developing device as viewed from near the toner replenishment section, illustrating a state where the loosening member is at a second position.
Figure 9:
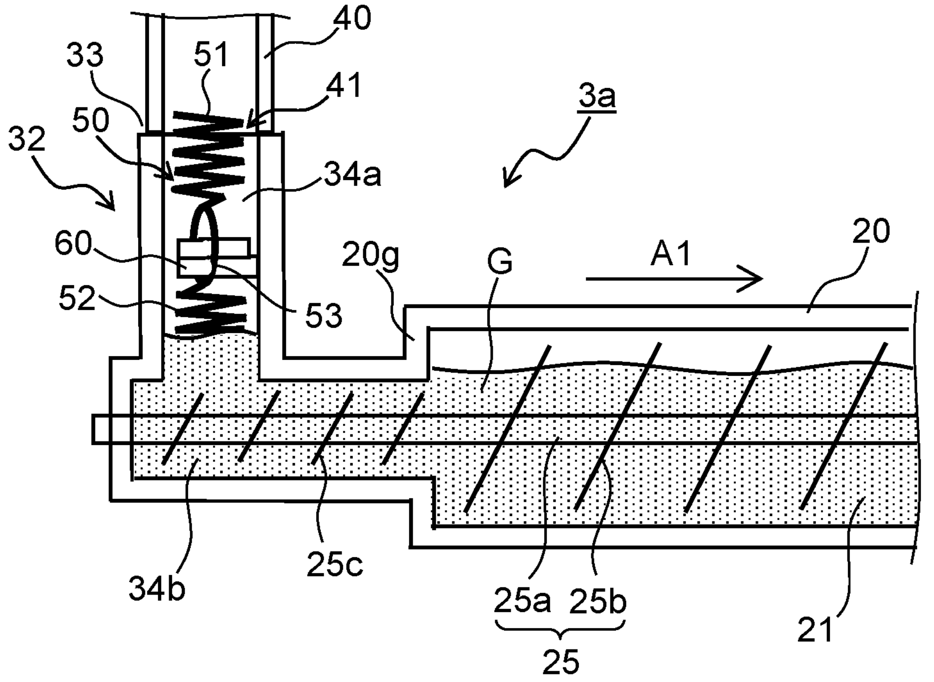
FIG. 9 is a longitudinal sectional view of the toner replenishment section and the stirring conveyance chamber of the developing device, illustrating the state where the loosening member is at the second position.

FIG. 8 is a side view of the developing device 3*a* as viewed from near the toner replenishment section 32, illustrating a state where the loosening member 50 is at a second position. FIG. 9 is a longitudinal sectional view of the toner replenishment section 32 and the stirring conveyance chamber 21 of the developing device 3*a*, illustrating the state where the loosening member 50 is at the second position.

When an amount of the developer in the toner replenishment section 32 is increased, as shown in FIG. 8 and FIG. 9, a lower end of the second loosening portion 52 is contacted by a developer G, and thus a raising force is exerted thereon. As a result, the loosening member 50 is lifted to move to the second position at which the clearance between the annular portion 53 and the eccentric rotary shaft 60 lies on an upper side of the eccentric rotary shaft 60. When the loosening member 50 is at the second position, the first loosening portion 51 protrudes upward beyond the connection portion 41 between the toner replenishment port 33 and the main-body-side conveyance path 40.

As a method for increasing the amount of the developer in the toner replenishment section 32, for example, the stirring conveyance screw 25 in the developing device 3*a* is driven to rotate reversely so that the replenishment vane 25*c* formed on the stirring conveyance screw 25 rotates reversely, and thus the developer in the stirring conveyance chamber 21 flows reversely to the horizontal conveyance portion 34*b* and hence is fed into the toner replenishment section 32.

When the eccentric rotary shaft 60 rotates in this state, the protrusion 61 makes contact with or separates from the inner circumferential surface of the annular portion 53 at a set cycle. More specifically, there repeatedly occur a state where the protrusion 61 makes contact with the inner circumferential surface of the annular portion 53 so that the annular portion 53 is pressed down and a state where the protrusion 61 separates therefrom so that the annular portion 53 is lifted by the developer G. As a result, within the vertical conveyance portion 34*a*, the loosening member 50 reciprocates in the up-down direction at the second position.

Consequently, the interior of the vertical conveyance portion 34*a* is in the state where the scraping-off operation is executed as a result of reciprocation of the loosening member 50 therein, and thus toner agglomeration can be prevented from occurring in the vertical conveyance portion 34*a*. Furthermore, the loosening member 50 oscillates at the second position at which the first loosening portion 51 upwardly penetrates the connection portion 41, and thus it is possible to suppress toner accumulation (toner clogging) that might occur at the connection portion 41.

Thus, it is possible to smoothly and reliably replenish the developing device 3*a* with the toner from the toner container 4*a* by use of a simple configuration. It is also possible to reduce to a minimum a print wait time (a down time) of the image forming apparatus 100 resulting from detective toner replenishment. Furthermore, normally, the loosening member 50 is arranged at the first position, in which case the first loosening portion 51 does not interfere with the main-body-side conveyance path 40 when the developing device 3*a* is mounted in or demounted from the image forming apparatus 100, and thus it is possible to smoothly mount or demount the developing device 3*a*.

Moreover, the loosening member 50 is caused to reciprocate up and down by a drive source shared with the developing device 3*a*, and thus there is no need for a separate drive source for causing the loosening member 50 to reciprocate, so that it is possible to effectively suppress toner agglomeration (blocking) in the vertical conveyance portion 34*a* by use of a simple configuration and at a reduced cost.

Next, a description is given of control paths of the image forming apparatus 100 of the present disclosure. FIG. 10 is a block diagram showing an example of the control paths used in the image forming apparatus 100 of the present disclosure. In using the image forming apparatus 100, the various portions thereof are controlled in different ways, so that the control paths of the image forming apparatus 100 as a whole are complicated. For this reason, the description herein focuses on parts of the control paths necessary for implementing the present disclosure.

A control section 90 includes at least a CPU (central processing unit) 91 as a central processor, a ROM (read-only memory) 92 that is a read-only storage portion, a RAM (random-access memory) 93 that is a readable/writable storage portion, a temporary storage portion 94 that temporarily stores image data or the like, a counter 95 that cumulatively counts the number of sheets printed, and a plurality of (herein, two) I/Fs (interfaces) 96 that transmit a control signal to the various devices in the image forming apparatus 100 and receive an input signal from an operation section 80.

The ROM 92 contains data and so on that are not changed during use of the image forming apparatus 100, such as a control program for the image forming apparatus 100 and numerical values required for control. The RAM 93 stores data necessitated in the course of controlling the image forming apparatus 100, data temporarily required for control of the image forming apparatus 100, and so on.

Furthermore, the control section 90 transmits a control signal from the CPU 91 to the various portions and devices in the image forming apparatus 100 via the I/Fs 96. Furthermore, from the various portions and devices, a signal indicating a status thereof or an input signal is transmitted to the CPU 91 via the I/Fs 96. Examples of the various portions and devices controlled by the control section 90 include the image forming portions Pa to Pd, the exposure device 5, the primary transfer rollers 6*a* to 6*d*, the secondary transfer roller 9, an image input portion 70, a voltage control circuit 71, the main motor 75, the developing drive motor 76, a toner supply motor 77, a current detection portion 78, and the operation section 80.

The image input portion 70 is a reception portion that receives image data transmitted from a personal computer or the like to the image forming apparatus 100. An image signal inputted through the image input portion 70 is converted into a digital signal, which then is fed out to the temporary storage portion 94.

The voltage control circuit 71 is connected to a charging voltage power supply 72, the developing voltage power supply 73, and a transfer voltage power supply 74 and operates each of these power supplies in accordance with an output signal from the control section 90. In accordance with a control signal from the voltage control circuit 71, the power supplies act as follows. That is, the charging voltage power supply 72 applies a charging voltage to a charging roller (not shown) in each of the charging devices 2*a* to 2*d*. The developing voltage power supply 73 applies, to the developing roller 30 in each of the developing devices 3*a* to 3*d*, a developing voltage obtained by superimposing an alternating-current voltage on a direct-current voltage. The transfer voltage power supply 74 applies a prescribed primary transfer voltage to each of the primary transfer rollers 6*a* to 6*d* and a prescribed secondary transfer voltage to the secondary transfer roller 9.

The toner supply motor 77 causes a toner replenishment screw (not shown) in each of the toner containers 4*a* to 4*d* to rotate so as to supply the toner stored in the each of the toner containers 4*a* to 4*d* to the toner replenishment section 32 of a corresponding one of the developing devices 3*a* to 3*d* via the main-body-side conveyance path 40.

The current detection portion 78 detects an output current that flows through the toner supply motor 77 at the time of driving of the toner supply motor 77. A result of the detection is transmitted to the control section 90. When toner clogging occurs at the connection portion 41 between the main-body-side conveyance path 40 and the toner replenishment section 32 (the toner replenishment port 33), due to an accumulated toner, a toner conveyance load is generated to increase a drive torque of the toner supply motor 77, thus increasing the output current of the toner supply motor 77. The control section 90 controls the current detection portion 78 to monitor an output current value of the toner supply motor 77 and thus can detect occurrence of toner clogging at the connection portion 41.

A liquid crystal display portion 81 and an LED 82 that indicates various statuses are provided in the operation section 80, and a user operates a stop/clear button of the operation section 80 to stop image formation and operates a reset button to reset various settings of the image forming apparatus 100 to default states. The liquid crystal display portion 81 is configured to display a status of the image forming apparatus 100, an image forming situation, and the number of copies printed. The various settings of the image forming apparatus 100 are made through a printer driver of a personal computer.

Figure 11:
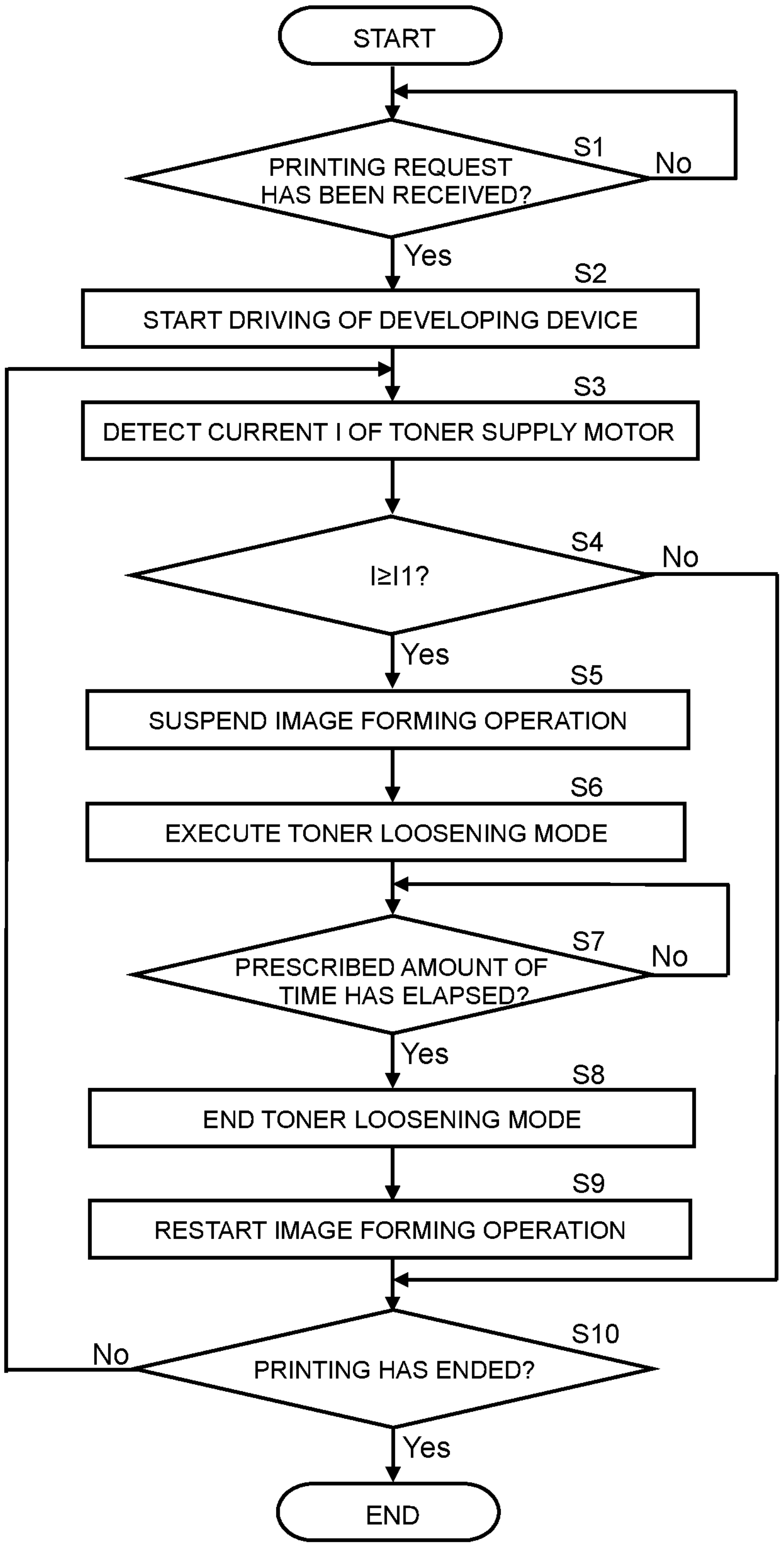
FIG. 11 is a flow chart showing an example of drive control of the developing device in the image forming apparatus.

FIG. 11 is a flow chart showing an example of drive control of the developing devices 3*a* to 3*d* in the image forming apparatus 100. With reference to FIG. 1 to FIG. 10 as necessary, a description is given of a procedure for executing a toner loosening mode that is executed in each of the developing devices 3*a* to 3*d* by following steps shown in FIG. 11.

The control section 90 determines whether or not a printing request has been received from a host apparatus such as a personal computer (step S1). When the printing request has not been received (No at step S1), a printing standby state is continued. When the printing request has been received (Yes at step S1), the control signal is transmitted to the developing drive motor 76 so that driving of the developing devices 3*a* to 3*d* is started (step S2). Further, concurrently with a start of an image forming operation, an output current I of the toner supply motor 77 is detected by the current detection portion 78 (step S3).

The control section 90 determines whether or not the output current I of the toner supply motor 77 has a value not less than a prescribed threshold value I1 (step S4). When I≥I1 (Yes at step S4), it is indicated that toner clogging is occurring at the connection portion 41 between the main-body-side conveyance path 40 and the toner replenishment section 32 of any of the developing devices 3*a* to 3*d*, and thus the image forming operation is suspended (step S5). Further, the toner loosening mode is executed in which the developing drive motor 76 is caused to rotate reversely so that the developing devices 3*a* to 3*d* in which the toner clogging is occurring are driven to rotate reversely (step S6).

When the developing devices 3*a* to 3*d* are each driven to rotate reversely, the stirring conveyance screw 25 rotates reversely, and thus the replenishment vane 25*c* formed on the stirring conveyance screw 25 also rotates reversely. As a result, the developer in the stirring conveyance chamber 21 flows reversely to the horizontal conveyance portion 34*h* of the toner replenishment section 32, thus pushing the loosening member 50 up to the second position (see FIG. 8). The eccentric rotary shaft 60 rotates reversely in this state so as to cause the loosening member 50 to reciprocate up and down at the second position, and thus it is possible to eliminate toner clogging at the connection portion 41.

The control section 90 determines whether or not a prescribed amount of time has elapsed since a start of the reverse rotation (step S7). When the prescribed amount of time has elapsed (Yes at step S7), the developing devices 3*a* to 3*d* are stopped from being driven to rotate reversely so as to end the toner loosening mode (step S8), and then the developing devices 3*a* to 3*d* are driven to rotate forwardly so as to restart the image forming operation (step S9). On the other hand, when I<I1 (No at step S4), the toner loosening mode is not executed, and the image forming operation is continuously performed.

After that, it is determined whether or not printing has ended (step S10), and when the printing has still been continuously performed (No at step S10), a return is made to step S3 at which the image forming operation and the detection of the output current I of the toner supply motor 77 are continuously performed and followed by repeated rounds of similar control (steps S3 to S9). When the printing has ended (Yes at step S10), the process is ended.

According to the control example shown in FIG. 11, when toner clogging at the connection portion 41 is detected during printing, the image forming operation is suspended and the toner loosening mode is executed, so that it is possible to swiftly eliminate the toner clogging. This prevents occurrence of a shortage of toner supply due to toner clogging at the connection portion 41, and thus an output image density can be maintained constant. Furthermore, since toner clogging is detected based on the output current of the toner supply motor 77, there is no need for a separate mechanism for detecting toner clogging, and thus it is possible to reduce the number of components used and to achieve a cost reduction.

Figure 12:
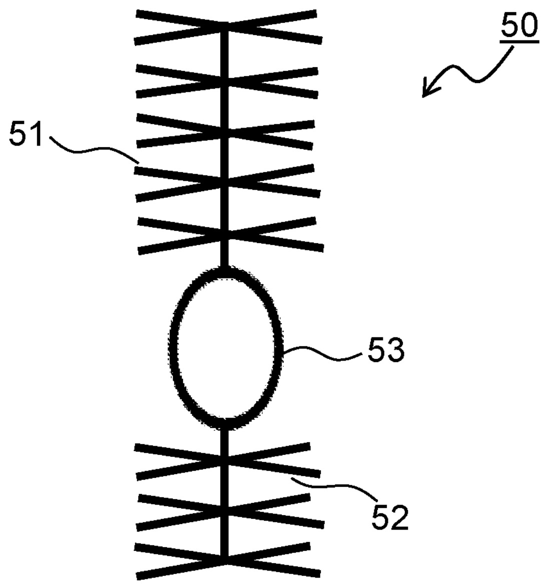
FIG. 12 is a side view showing still another example of the loosening member different in shapes of a first loosening portion and a second loosening portion.

Other than the above, the present disclosure is not limited to the foregoing embodiment and can be variously modified without departing from the spirit of the disclosure. For example, the foregoing embodiment has illustratively described the loosening member 50 including the first loosening portion 51 and the second loosening portion 52 that are each in the shape of a coil spring. This is merely an example, and, for example, as shown in FIG. 12, the loosening member 50 may also be configured to include, as the first loosening portion 51 and the second loosening portion 52, protruding pieces or ribs extending radially from a core extending in the vertical direction.

Furthermore, while in the foregoing embodiment, the stirring conveyance screw 25 is driven to rotate reversely so that the developer in the developing container 20 is fed into the toner replenishment section 32, thus moving the loosening member 50 to the second position, the method for increasing the amount of the developer in the toner replenishment section 32 is not limited to driving the stirring conveyance screw 25 to rotate reversely. For example, a method may also be adopted in which a bypass conveyance path for establishing communication between the developing container 20 and the toner replenishment section 32 is provided, and when the loosening member 50 is moved to the second position, the developer is fed from the developing container 20 into the toner replenishment section 32 via the bypass conveyance path.

Furthermore, while in the foregoing embodiment, toner clogging is detected based on the output current of the toner supply motor 77, which is detected by the current detection portion 78, a configuration is also possible in which there is provided a torque detection mechanism that directly detects a rotation torque of the toner supply motor 77, and toner clogging is detected based on a result of the detection by the torque detection mechanism.

Furthermore, while the foregoing embodiment has described the configuration in which the toner is replenished to the developing devices 3*a* to 3*d* in each of which the stirring conveyance chamber 21 and the supply conveyance chamber 22 are arranged in parallel, a configuration may also be adopted in which a toner is replenished to the developing devices 3*a* to 3*d* each including the stirring conveyance chamber 21 and the supply conveyance chamber 22 arranged above the stirring conveyance chamber 21. Furthermore, while the foregoing embodiment has described the example in which the developer is supplied from the supply conveyance screw 26 to the developing roller 30, the present disclosure is not limited thereto. A configuration may also be adopted in which a developer carrying member such as a magnetic roller or the like is further provided between the supply conveyance screw 26 and the developing roller 30, and after a developer is supplied from the supply conveyance screw 26 to the magnetic roller or the like, only a toner is supplied from the magnetic roller or the like to the developing roller 30.

Furthermore, while the foregoing embodiment has described the toner replenishment section 32 that replenishes each of the developing devices 3*a* to 3*d* with the toner from a corresponding one of the toner containers 4*a* to 4*d*, the toner conveyance device of the present disclosure is not limited to the toner replenishment section 32 as long as it has a configuration in which a horizontal conveyance portion is arranged on a downstream side of a vertical conveyance portion. For example, in a configuration in which an intermediate hopper that temporarily stores a toner is provided between each of the toner containers 4*a* to 4*d* (see FIG. 1) and a corresponding one of the developing devices 3*a* to 3*d*, the present disclosure is applicable to a toner conveyance device that replenishes the intermediate hopper with a toner from the each of the toner containers 4$a$ to 4$d$. Alternatively, the present disclosure is also applicable to a waste toner conveyance device that conveys a waste toner from the cleaning devices 7$a$ to 7$d$ (see FIG. 1) to a waste toner collection container (not shown).

Furthermore, the present disclosure is not limited to a tandem color printer as shown in FIG. 1 and is also applicable to various types of image forming apparatuses each including a toner conveyance device in which a horizontal conveyance portion is arranged on a downstream side of a vertical conveyance portion, such as a digital or analog monochrome copy machine, monochrome printer, color copy machine, or facsimile.

The present disclosure is usable in a toner conveyance device including a vertical conveyance portion and a horizontal conveyance portion connected to a lower end of the vertical conveyance portion. Through the use of the present disclosure, it is possible to provide a toner conveyance device capable of suppressing, in a toner conveyance section including a vertical conveyance portion and a horizontal conveyance portion, toner coagulation at the vertical conveyance portion and also suppressing toner accumulation at a connection portion at an upper end of the vertical conveyance portion, and a developing device and an image forming apparatus including the same.

What is claimed is:

1. A toner conveyance device that is demountably mounted in an image forming apparatus, the toner conveyance device comprising:

a vertical conveyance portion that has an entry port and conveys a toner or a developer containing the toner conveyed therein through the entry port by causing the toner or the developer to fall vertically, the entry port being formed at an upper end of the vertical conveyance portion and connected to a main-body-side conveyance path in the image forming apparatus;

a horizontal conveyance portion that is connected to a lower end of the vertical conveyance portion and conveys the toner or the developer in a horizontal direction;

a conveyance member that includes:

a rotary shaft that is arranged in the horizontal conveyance portion along a conveyance direction of the toner or the developer; and a conveyance protrusion that is provided to protrude on an outer circumferential surface of the rotary shaft, the conveyance member causing the rotary shaft to rotate so that the toner or the developer in the horizontal conveyance portion is conveyed in a direction along the rotary shaft by the conveyance protrusion; and a loosening member that is arranged in the vertical conveyance portion so as to be movable in a vertical direction, wherein the loosening member is arranged so as to be movable between a first position below a connection portion between the main-body-side conveyance path and the entry port and a second position protruding upward beyond the connection portion and is reciprocatable in the vertical direction at each of the first position and the second position, the loosening member is arranged at the first position under its own weight when a volume of the toner or the developer in the horizontal conveyance portion is less than a prescribed value and is arranged at the second position by being pushed up by the toner or the developer when the volume of the toner or the developer in the horizontal conveyance portion is not less than the prescribed value, and the toner or the developer is fed into the vertical conveyance portion so as to enable execution of a toner loosening mode in which the loosening member is caused to reciprocate at the second position.

2. The toner conveyance device according to claim 1, wherein the conveyance member is driven to rotate reversely, and thus the toner or the developer in the horizontal conveyance portion flows reversely to the vertical conveyance portion so as to cause the loosening member to reciprocate at the second position.

3. The toner conveyance device according to claim 1, wherein the loosening member includes:

a first loosening portion that is arranged on an upper side in the vertical conveyance portion and has an upper end opposed to the entry port;

a second loosening portion that is arranged on a lower side in the vertical conveyance portion and has a lower end opposed to the conveyance member; and an annular portion that connects the first loosening portion to the second loosening portion and engages with an eccentric rotary shaft that is provided to protrude horizontally in the vertical conveyance portion, with a prescribed clearance provided between the annular portion and the eccentric rotary shaft in the vertical direction, and the eccentric rotary shaft rotates in contact with an inner circumferential surface of the annular portion, thus causing the loosening member to reciprocate in the vertical direction at each of the first position and the second position.

4. The toner conveyance device according to claim 3, wherein the first loosening portion and the second loosening portion are each in a shape of a helical spring, and the annular portion has an oval shape elongated in the vertical direction or a rectangular shape elongated in the vertical direction in which the inner circumferential surface has rounded corners.

5. The toner conveyance device according to claim 3, wherein the eccentric rotary shaft is driven to rotate by a drive source shared with the conveyance member.

6. A developing device, comprising:

a developing container that stores the developer;

a stirring conveyance member that stirs and conveys the developer in the developing container; and a developer carrying member that is rotatably supported to the developing container and carries the developer in the developing container, wherein the developing device further comprises the toner conveyance device according to claim 1 as a toner replenishment section that replenishes the developing container with the toner.

7. The developing device according to claim 6, wherein the conveyance member shares the rotary shaft with the stirring conveyance member, and the conveyance member is caused to rotate reversely together with the stirring conveyance member, and thus the developer in the developing container flows reversely from the horizontal conveyance portion to the vertical conveyance portion in the toner replenishment section so as to cause the loosening member to reciprocate at the second position.

8. An image forming apparatus, comprising:

the developing device according to claim 7;

a developing drive motor that drives the stirring conveyance member;

a toner storage portion that stores the toner to be supplied to the developing device;

the main-body-side conveyance path that connects the toner storage portion to the toner replenishment section;

a toner supply motor that supplies the toner stored in the toner storage portion to the toner replenishment section via the main-body-side conveyance path;

a control section that controls the developing drive motor and the toner supply motor; and a detection mechanism that detects accumulation of the toner at the connection portion, wherein upon the detection mechanism detecting accumulation of the toner, the control section is capable of executing the toner loosening mode in which the developing drive motor drives the conveyance member to rotate reversely together with the stirring conveyance member, and thus the developer in the developing container flows reversely to the toner replenishment section so as to cause the loosening member to reciprocate at the second position.

9. The image forming apparatus according to claim 8, further comprising:

as the detection mechanism, a torque detection mechanism that detects a rotation torque of the toner supply motor, wherein the control section detects accumulation of the toner at the connection portion based on the rotation torque of the toner supply motor detected by the torque detection mechanism.

10. The image forming apparatus according to claim 9, wherein the torque detection mechanism is a current detection portion that detects an output current of the toner supply motor, and the control section detects accumulation of the toner at the connection portion based on the output current of the toner supply motor detected by the current detection portion.

* * * * *